(12) United States Patent
Simonsen

(10) Patent No.: US 10,472,264 B2
(45) Date of Patent: Nov. 12, 2019

(54) FLOATING POOL SANITIZER WITH LOCKING DEVICE

(71) Applicant: INNOVATIVE WATER CARE, LLC, Alpharetta, GA (US)

(72) Inventor: Frederick Simonsen, Alpharetta, GA (US)

(73) Assignee: INNOVATIVE WATER CARE, LLC, Alpharetta, GA (US)

( * ) Notice: Subject to any disclaimer, the term of this patent is extended or adjusted under 35 U.S.C. 154(b) by 0 days.

(21) Appl. No.: 15/975,831

(22) Filed: May 10, 2018

(65) Prior Publication Data

US 2018/0327291 A1 Nov. 15, 2018

Related U.S. Application Data

(60) Provisional application No. 62/504,593, filed on May 11, 2017.

(51) Int. Cl.
| | | |
|---|---|---|
| *C02F 1/68* | (2006.01) |
| *B01F 1/00* | (2006.01) |
| *C02F 1/50* | (2006.01) |
| *E04H 4/12* | (2006.01) |
| *B01F 13/00* | (2006.01) |
| *B01D 11/02* | (2006.01) |
| *C02F 103/42* | (2006.01) |

(52) U.S. Cl.
CPC ............ *C02F 1/688* (2013.01); *B01F 1/0027* (2013.01); *B01F 13/0049* (2013.01); *C02F 1/50* (2013.01); *E04H 4/1281* (2013.01); *B01D 11/02* (2013.01); *B01F 2215/0052* (2013.01); *C02F 2103/42* (2013.01); *C02F 2303/04* (2013.01)

(58) Field of Classification Search
CPC ........ C02F 1/688; C02F 1/50; C02F 2103/42; C02F 2303/04; B01F 13/0049; B01F 1/0027; B01F 2215/0052; E04H 4/1281; B01D 11/02
USPC ............... 210/167.11, 198.1, 242.1; 422/265
See application file for complete search history.

(56) References Cited

U.S. PATENT DOCUMENTS

| | | | |
|---|---|---|---|
| 3,311,247 A | 3/1967 | Rigor | |
| 4,511,051 A | 4/1985 | Desai | |
| 4,828,803 A | 5/1989 | Nicholson et al. | |
| 4,828,805 A * | 5/1989 | Connors | B01F 1/0027 137/268 |

(Continued)

OTHER PUBLICATIONS

International Search Report and Written Opinion PCT/US18/31957, dated Aug. 1, 2018.

*Primary Examiner* — Fred Prince
(74) *Attorney, Agent, or Firm* — Brown Rudnick LLP

(57) ABSTRACT

A floating chemical dispenser is disclosed that is configured to dispense a chemical into a body of water, such as pool water. The chemical dispenser includes a float attached to a container. The container contains a chemical composition, such as a chlorine source. The container also defines an aperture that allows water to enter the container at a controlled rate. When the dispenser is placed in a body of water, water enters the container and gradually dissolves and releases the chemical. An end cap is position on the container and rotates between a closed position and at least one chemical dispensing position. The end cap further includes a locking device that locks the end cap into a closed position to prevent inadvertent release of the chemical.

16 Claims, 11 Drawing Sheets

(56) References Cited

U.S. PATENT DOCUMENTS

| | | |
|---|---|---|
| 5,082,129 A | 1/1992 | Kramer |
| 5,476,116 A | 12/1995 | Price et al. |
| 5,865,330 A | 2/1999 | Buono |
| 6,432,317 B1 | 8/2002 | Oliver, Jr. |
| 7,704,467 B2 | 4/2010 | Hodgetts et al. |
| 7,922,982 B1 | 4/2011 | Brennan |
| 2004/0175311 A1 | 9/2004 | Cormier |
| 2006/0276338 A1 | 12/2006 | Hodgetts |
| 2008/0116150 A1 | 5/2008 | Lloyd |
| 2011/0089121 A1 | 4/2011 | Van Der Meijden |
| 2013/0092634 A1* | 4/2013 | King ........................ C02F 1/76 210/749 |

* cited by examiner

FLOATING POOL SANITIZER WITH LOCKING DEVICE

RELATED APPLICATION

The present application is based on and claims priority to U.S. Provisional Patent application Ser. No. 62/504,593, filed on May 11, 2017, which is incorporated herein by reference.

BACKGROUND

Swimming pool water, fountain water, and the like are susceptible to infestation by various microorganisms, such as algae. For instance, if untreated, swimming pool water can provide a hospitable forum for the growth of bacteria, algae and other undesirable and potentially unhealthy organisms. Consequently, pool water, and spas are typically treated with chemicals designed to kill and control the above organisms. The chemicals can be applied to the pool water on a periodic or a continuous basis.

Such treatment, for instance, is typically undertaken via the introduction of a halogen, such as chlorine, into the pool water at levels effective to kill or control the unwanted organisms. The halogen source may be in liquid form or may be in a solid form. The solid form can be designed to quickly or slowly dissolve in the pool water. Solid sources of chlorine, for instance, include calcium hypochlorite and the like.

Various different techniques and methods have been developed in order to deliver a chemical, such as chlorine, to pool water. For instance, one type of chemical feeder that has been used in the past is referred to as a flowing erosion dispenser that provides continuous release of the chemical. The floating chemical dispenser, for instance, can include an upper end float attached to a container. A solid chemical can be placed in the container and the container can include at least one opening that allows water to enter the container and dissolve the chemical for release into the pool water. In one embodiment, the floating dispenser, when empty, has a center of gravity that is not symmetrical with the container. Consequently, as the chemical within the container is dissolved and becomes exhausted, the floating dispenser tips over and floats horizontally in the water indicating to a user that the floating dispenser is empty and needs to be replaced.

One embodiment of a floating chemical dispenser is disclosed in U.S. Pat. No. 7,704,467 which is incorporated herein by reference. In the '467 patent, the floating dispenser contains chemical tablets composed of compressed calcium hypochlorite, an algicide, and an agglomerating agent, such as zinc sulfate and sodium aluminate.

Floating chemical dispensers typically include a closing mechanism that closes the opening in the container to prevent inadvertent release of the chemical contained in the dispenser. The closing mechanism, however, can be susceptible to opening during packing, shipping and handling of the dispenser. Consequently, in the past, a shrink wrap film or tape was placed over the closing mechanism to keep the dispenser in a closed position until the dispenser was placed in use. Shrink wrap film or tape as described above, however, cannot be reused, and, once removed from the dispensing container, leaves the closure mechanism unprotected.

In view of the above, a need exists for a locking device capable of maintain a floating chemical dispenser in the closed position to prevent against inadvertent spills or release of the chemical contained in the dispenser. A need further exists for a locking mechanism for floating pool dispensers that are also child resistant.

SUMMARY

In general, the present disclosure is directed to a floating chemical dispenser for containing and dispensing chemicals into a body of water, such as into pool water or water contained in a spa. The floating chemical dispenser can also be used in all different types of water systems, such as public fountains and the like. In accordance with the present disclosure, the floating chemical dispenser includes a locking device that prevents the dispenser from inadvertent spills or opening of the container prior to use. In one embodiment, the locking device can include child resistant characteristics and properties.

In one embodiment, the present disclosure is directed to a floating chemical dispenser for containing and dispensing chemicals to treat a body of water. The dispenser includes a float positioned at an upper end of the dispenser. The floating chemical dispenser further includes a container having a top and a bottom. The top of the container is adjacent to the float. For instance, in one embodiment, the top of the container can be attached to the float or, alternatively, a collar can be used to attach the float to the container. The container defines an interior compartment configured to hold a chemical. The chemical, for instance, may comprise a solid chemical. The solid chemical may comprise a halogen source, such as a chlorine source that releases chlorine when dissolved. In one embodiment, for instance, the chemical contained in the container may comprise trichloro-s-triazinetrione. The container can include an open top for receiving the chemical and a closed bottom. The container can also define at least one aperture positioned to receive water from the outside environment for combining with a chemical and dispensing the chemical into the body of water.

The floating chemical dispenser further includes an end cap attached to the bottom of the container. The end cap can be held on the container by a retaining device. The retaining device can be designed to prevent the end cap from being released from the container. In one embodiment, for instance, the retaining device comprises a retaining ring on the container and a locking element on the end cap. The locking element can reside within the retaining ring on the container. The end cap defines at least one orifice and is rotatable in relation to the retainer. For example, the end cap can be rotatable between a closed position and a chemical dispensing position. When in the chemical dispensing position, for instance, the at least one orifice is aligned with the aperture on the container. In one embodiment, the end cap can include two orifices, three orifices, or more. Each orifice can have a different surface area. In this manner, a particular orifice can be aligned with the aperture for controlling the amount of chemical that is released from the dispenser.

In accordance with the present disclosure, the floating chemical dispenser further includes a locking device that prevents the end cap from rotating when enabled.

In one embodiment, the end cap includes two opposing tab portions that, when pressed simultaneously, disables the locking device and allows the end cap to rotate. For example, in one embodiment, the locking device may comprise at least one locking tab located on the end cap. Pressing both of the tab portions simultaneously causes the locking tabs to move from a locked position to an unlocked position so that the end cap can rotate. In one embodiment, for instance, each locking tab can reside in a recess located on a container which prevents the cap from rotating. Pressing both tab portions simultaneously, however, moves the locking tabs out of the recesses and disables the locking device. The locking tabs and the recesses can be located at any suitable location on the end cap and on the container. In one embodiment, for example, the recesses are located on a side wall of the container.

In an alternative embodiment, the locking device includes a tab portion that engages the container and prevents the end cap from rotating. In this embodiment, lifting the tab portion causes the tab portion to disengage the container and disable the locking device.

In another embodiment, the locking device includes at least one removable tab that engages the container and prevents the end cap from rotating. The tab may be located on the end cap and may have a perimeter defined by perforations that lets the tab be removed from the container for disabling the locking device.

In one embodiment, the locking tab on the end cap can include a pull tab. Pulling the tab disengages the locking device and allows the end cap to rotate.

In yet another embodiment, the locking device comprises a pin on the container that resides in a slot located on the end cap. The slot can include a first vertical portion, a horizontal portion, and a second vertical portion. Moving the end cap so that the pin travels over the slot causes the end cap to rotate and disables a locking device. The floating chemical dispenser of the present disclosure can also include various other features. In one embodiment, the end cap includes a rib member and the container defines a plurality of rib receiving channels. The rib receiving channels are located along a path of travel of the rib member when the cap is rotated. Each rib receiving channel can be positioned so as to align with a position on the end cap. For instance, one of the rib receiving channels can align with the rib member at a closed position of the end cap. Another rib receiving channel can align with the rib member when the end cap is rotated to a chemical dispensing position. The rib member and rib receiving channels not only allow the user to determine how much to rotate the end cap but also temporarily holds the end cap at a desired position. In one embodiment, the rib receiving channels can be located on the bottom surface of the container and the rib member can be located on an adjoining surface of the end cap. The bottom surface of the container can also include an abutment that prevents the end cap from rotating in one direction. In this manner, the end cap only rotates in a direction toward the chemical dispensing position.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
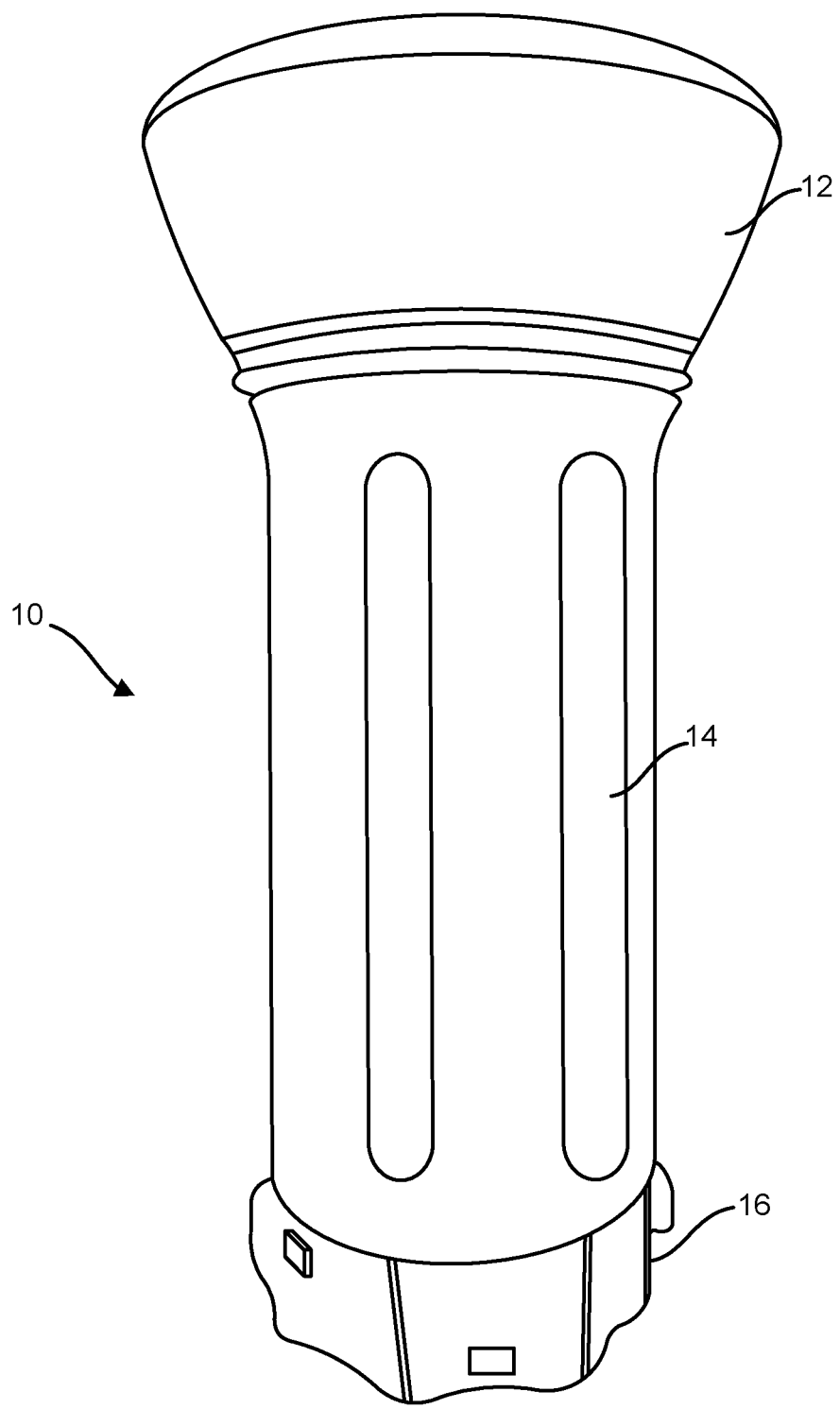
FIG. 1 illustrates one embodiment of a floating chemical dispenser made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a floating chemical dispenser. The floating chemical dispenser includes a float and a container for a chemical. When a chemical is loaded into the container and the dispenser is dropped into a body of water, the floating chemical dispenser floats upright and slowly releases the chemical contained within the container. For instance, the container can include an aperture that allows water to enter the container and dissolve the chemical. In accordance with the present disclosure, the container further includes an end cap that rotates on the container between a closed position that blocks the aperture and a chemical dispensing position in which an orifice on the end cap aligns with the aperture on the container to allow water to enter the container. The end cap and the container further include a locking device that prevents the end cap from rotating. The locking device can be used to prevent against inadvertent chemical spills or release. The locking device on the end cap can also be designed to be child resistant.

In one embodiment, the locking device can be designed for repeated use. For example, in one embodiment, the locking device includes a locking tab or element located on the container or on the end cap. The end cap can include two opposing tab portions that, when pressed simultaneously, release the locking element or tab and allow the end cap to be rotated.

Referring to FIG. 1, one embodiment of a floating chemical dispenser 10 made in accordance with the present disclosure is shown. As illustrated, the floating chemical dispenser 10 includes a float 12 attached to a container 14. The container 14 is for holding a chemical. Attached to the container is an end cap 16. The end cap rotates between a closed position that prevents the chemical from be dispensed and one or more chemical dispensing positions that allow water from the environment to enter the container and dissolve the chemical.

Figure 2:
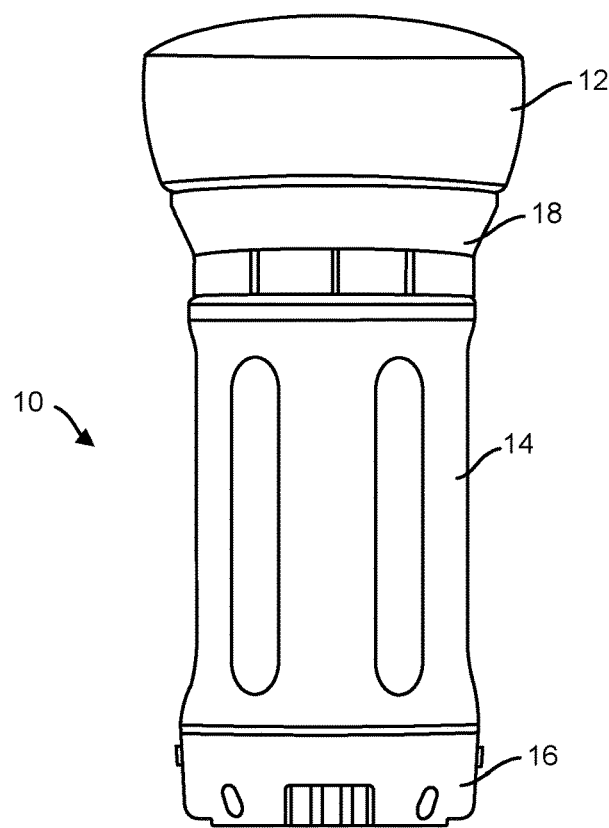
FIG. 2 illustrates another embodiment of a floating chemical dispenser made in accordance with the present disclosure including a retaining collar.

Referring to FIG. 2, another embodiment of a floating chemical dispenser is illustrated. Like reference numerals have been used to indicate similar elements. As shown, in the embodiment illustrated in FIG. 2, the floating chemical dispenser 10 includes a float 12 and an end cap 16. In addition, the floating chemical dispenser 10 includes a retaining collar 18. The retaining collar 18 connects the float 12 to the container 14.

Figure 3:
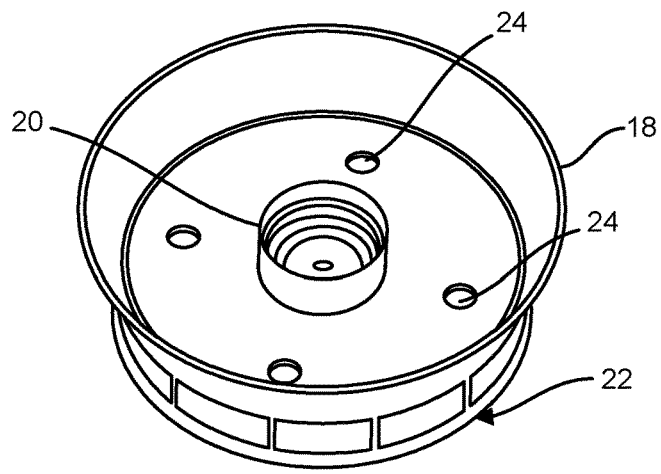
FIG. 3 is a perspective view of the retaining collar incorporated into the floating chemical dispenser illustrated in FIG. 2.

Referring to FIG. 3, the retaining collar 18 is shown in more detail. As illustrated, the retaining collar 18 includes a first plurality of threads 20 that are intended to engage the float 12. On the opposite side, the retaining collar further includes a second set of threads 22 that attach to and engage the container 14. As shown in FIG. 3, the retaining collar 18 can further include a plurality of vent openings 24. The vent openings 24 can allow gases within the container 14 to be released and water to flow back into the body.

The container 14 of the floating chemical dispenser 10 includes an interior compartment that is designed to hold a chemical. The chemical, for instance, may comprise a solid that dissolves and releases a sanitizing agent capable of killing or controlling unwanted organisms such as bacteria, algae and the like in a body of water. For example, the chemical may comprise a halogen source, such as a chlorine source. Solid sources of chlorine include calcium hypochlorite, dichloroisocyanuric acid, trichloroisocyanuric acid and the like. In one embodiment, the chlorine source comprises trichloro-s-triazinetrione. The halogen source may be present alone or in conjunction with other components within the solid composition. The halogen source may be combined with various other compatible chemicals for different purposes and benefits. For instance, the solid chemical may also contain other biocides or algicides, agglomerating agents and the like. In one embodiment, the solid may contain zinc sulfate, zinc oxide, and/or sodium aluminate. The solid chemical composition can be present in the container in any suitable form. For instance, the solid chemical may be in the form of pellets, granules or the like. In one embodiment, for instance, the container 14 includes disks made from the solid chemical composition. Alternatively, the container may include loose chemicals or chemicals held with an inner package or with a shrink film. The inner package shall secure the chemical contents, but allow water to flow freely to allow the chemicals to dissolve. The inner package can be mesh, water soluble film, shrink sleeve film with holes, etc. The container 14 can have any length in order to accommodate one disk or a plurality of disks. For example, in one embodiment, the container 14 may be designed to hold three disks stacked together within the interior compartment.

Figure 4:
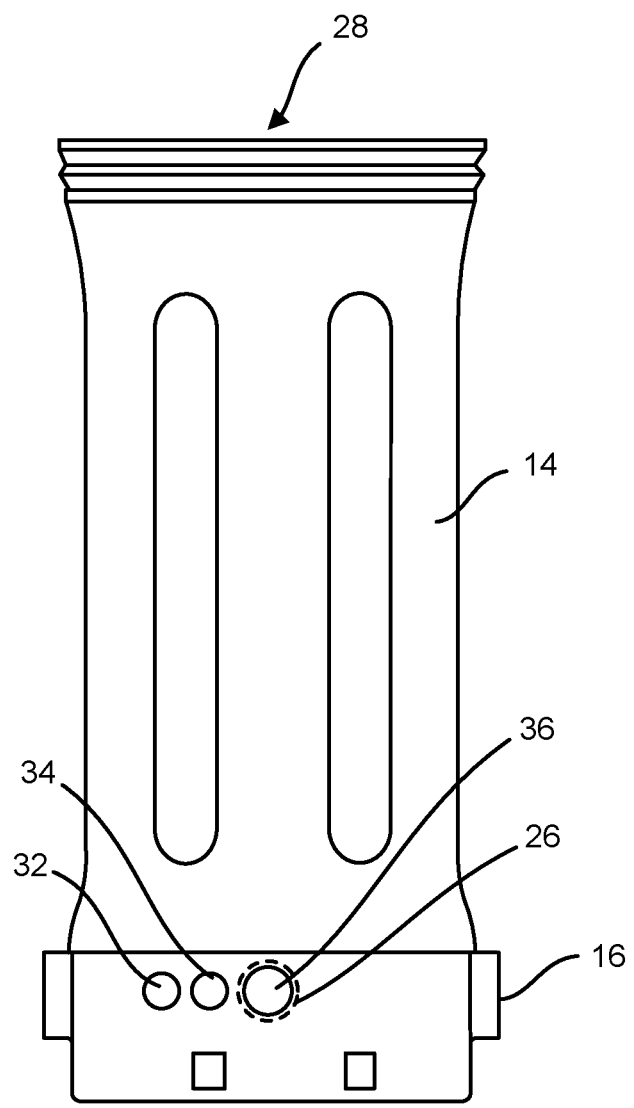
FIG. 4 illustrates one embodiment of a container and an end cap that may be used to construct a floating chemical dispenser in accordance with the present disclosure.
Figure 5:
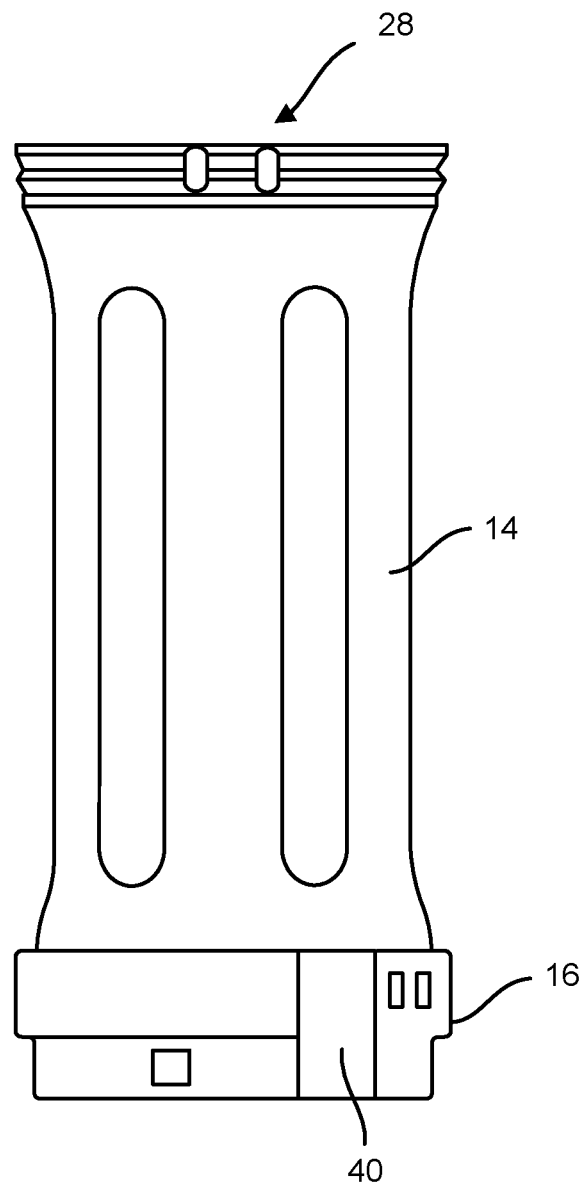
FIG. 5 is another view of the container and the end cap of FIG. 4.
Figure 6:
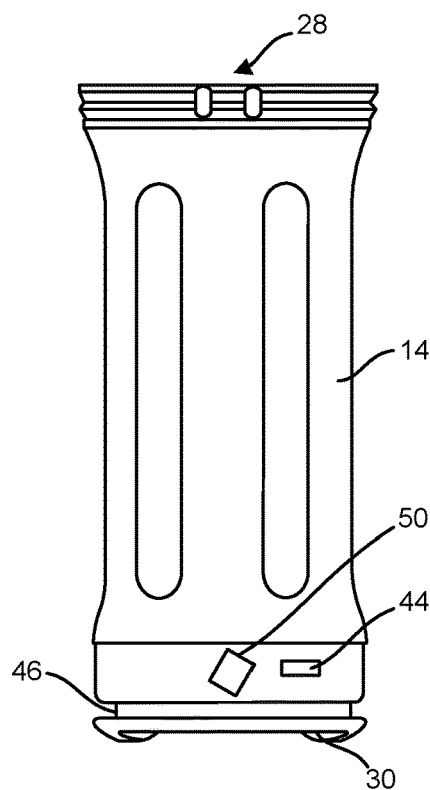
FIG. 6 illustrates one embodiment of a container that may be incorporated into a floating chemical dispenser in accordance with the present disclosure.

Referring to FIGS. 4 through 10, the container 14 and the end cap 16 are shown in greater detail. As shown in FIG. 6, the container 14 can include an open top 28 and a closed bottom 30. As shown in FIG. 4, the container can also define an aperture 26. The aperture 26 allows water from the surrounding environment to enter the interior compartment of the container 14 and dissolve the chemical composition held within the container. As the chemical composition dissolves, a chemical is released into the surrounding water for controlling algae, bacteria, and other microorganisms. In this manner, the floating chemical dispenser 10 can be placed in a body of water, such as in pool water, and can float and dispense chemical continuously. The size of the aperture 26 can be controlled in order to control the amount of chemical that is dispensed.

In one embodiment, the floating chemical dispenser 10 can be designed to indicate to a user when the chemical composition has fully dissolved and has been exhausted. For instance, the chemical dispenser 10 can be designed to float upright when containing a chemical composition. When the chemical composition has completely dissolved, the floating chemical dispenser 10 can have a center of gravity slightly off center that causes the dispenser to tip over and float in a more horizontal position. Various different methods and techniques can be implemented in order to give the floating chemical dispenser 10 a center of gravity that is slightly off center (from a central axis that extends from the top to the bottom of the dispenser). For instance, in U.S. Pat. No. 7,704,467, a disk can be placed in the container 14 and positioned off center which can cause the floating chemical dispenser 10 to tip over if empty and placed in a body of water. In alternative embodiments, extra weight can be placed off center in the container 14, in the float 12, in the end cap 16, or in the retaining collar 18.

The end cap 16 is rotatable in relation to the container 14. As shown particularly in FIG. 4, for instance, the end cap can include at least one dispensing orifice. In FIG. 4, for instance, the end cap defines three orifices 32, 34 and 36. The surface area or diameter of each orifice varies. For instance, orifice 32 has a smaller surface area than orifice 34, which has a smaller surface area than orifice 36. Orifice 36, for instance, can generally have the same diameter or surface area as the aperture 26.

Each orifice can generally have a diameter of from about 2 mm to about 25 mm. For instance, each orifice can have a diameter of greater than about 3 mm, such as greater than about 4 mm, such as greater than about 5 mm, such as greater than about 6 mm, such as greater than about 7 mm, such as greater than about 8 mm. The diameter of each orifice can generally be less than about 20 mm, such as less than about 15 mm, such as less than about 13 mm, such as less than about 12 mm, such as less than about 11 mm, such as less than about 10 mm.

The end cap 16 can include a closed position in which the orifice 26 is completely blocked. In the closed position, the chemical composition contained within the floating chemical dispenser 10 remains protected and is not released from the container. Rotating the end cap 16 so that one of the orifices 32, 34 or 36 aligns with the aperture 26, however, places the floating chemical dispenser 10 into a chemical dispensing position where water can enter the container 14 for releasing the chemical composition. The orifices 32, 34 and 36 have different sizes for controlling the amount of chemical that is released. Having different orifices as shown in FIG. 4 allows for the floating chemical dispenser 10 to be adjustable. For instance, a particular orifice size may be selected based upon the size of the body of water or the pool size. For larger pools, for instance, a larger orifice may be selected. The different orifices can also be used to treat the pool in different ways. For instance, the large orifice 36 may be aligned with the aperture 26 in order to shock the pool and release large amounts of chemical very quickly. The smaller orifice 32, on the other hand, can be selected for a continuous release of the chemical and to maintain the pool within the proper chemical balance. Orifice 34, on the other hand, can be selected in order to make slight adjustments in order to, for instance, prevent the growth of algae.

In order to avoid inadvertent release or spills of the chemical composition, the floating chemical dispenser 10 in accordance with the present disclosure further includes a locking device that prevents the end cap 16 from rotating when the locking device is enabled. In one embodiment, the locking device of the present disclosure can be engaged and disengaged repeatedly. In this manner, the end cap 16 can be locked in to a closed position even after the floating chemical dispenser 10 has been removed from the packaging in which it is shipped and sold. In addition, the locking device can be engaged after the floating chemical dispenser 10 has been partially used. For instance, in some situations, a user may want to remove the floating chemical dispenser from a pool for short periods of time or in order to store the dispenser during the off season or during a pool party. The locking device of the present disclosure can also be designed to be child resistant to prevent a child from inadvertently rotating the end cap 16.

Figure 7:
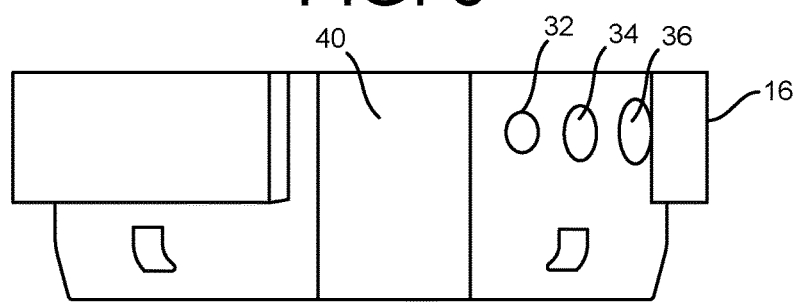
FIG. 7 illustrates a side view of one embodiment of an end cap for a floating chemical dispenser in accordance with the present disclosure.
Figure 8:
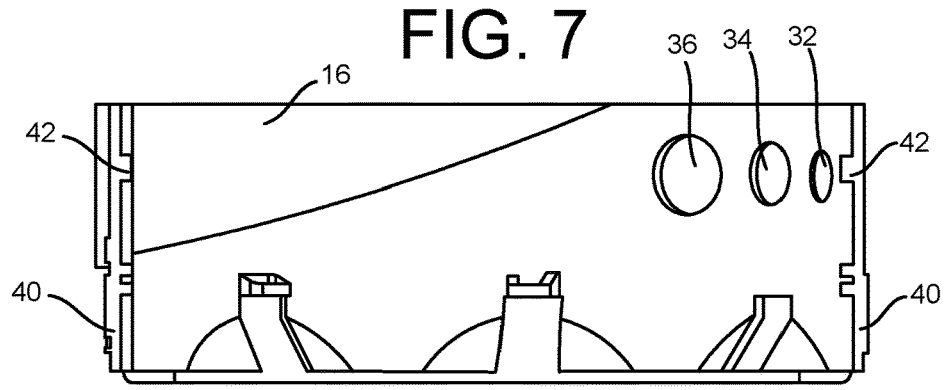
FIG. 8 illustrates a cross sectional view of the end cap illustrated in FIG. 7.
Figure 9:
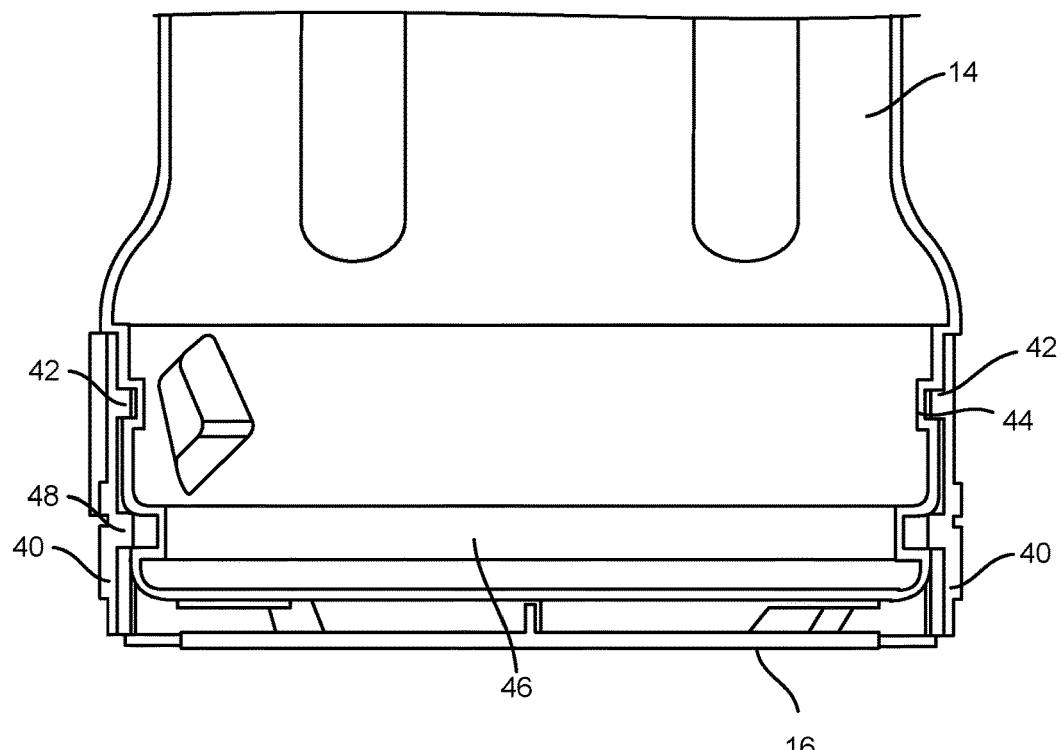
FIG. 9 illustrates a cross sectional view of the end cap illustrated in FIG. 8 when engaged with the container illustrated in FIG. 6.
Figure 10:
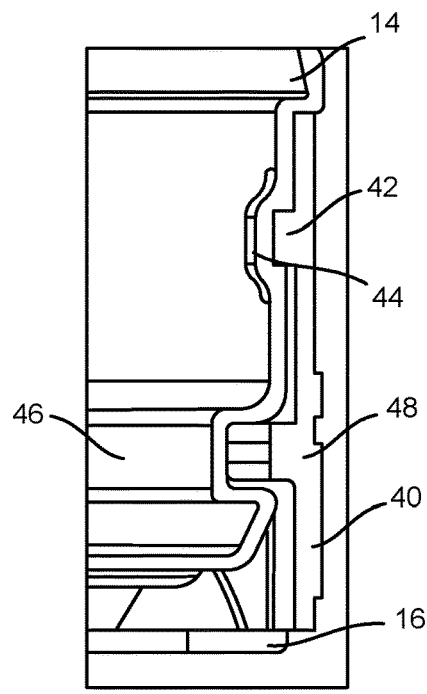
FIG. 10 illustrates an enlarged portion of the end cap and the container illustrated in FIG. 9.

FIGS. 4 through 8 illustrate one embodiment of a locking device in accordance with present disclosure. As shown in FIGS. 5 and 7, for instance, the end cap 16 includes a pair of opposing tab portions 40. In one embodiment as shown in FIG. 8, the tab portions can be positioned 180° apart along the end cap 16. In other embodiments, the tab portions 30 can be spaced from about 90° to about 180° apart. Each tab portion 40 includes a locking tab 42 as particularly shown in FIGS. 8, 9 and 10. The locking tab 42 engages the container 14 and prevents the end cap 16 from rotating. For instance, the container 14 can define a recess 44 as shown in FIGS. 6, 9 and 10. When the locking tab 42 is contained within the recess 44, the locking tab 42 prevents the end cap 16 from rotating.

In order to disable the locking device and rotate the end cap 16, a user can simultaneously press the tab portions 40 and twist the end cap 16. For instance, as particularly shown in FIG. 10, when the tab portion 40 is pressed inwardly, the locking tab 42 pivots out of the recess 44 and allows the end cap 16 to rotate.

As described above, the locking device on the floating chemical dispenser 10 can be child resistant. In this regard, having two tab portions 40 located on opposing sides of the container prevents a person with small hands from pressing in both tab portions simultaneously.

In order to keep the end cap 16 on the container 14 and to make sure that the end cap 16 rotates in alignment with the container, the floating chemical dispenser 10 can include a retaining device. As shown in FIGS. 6, 9 and 10, for instance, the container 14 can define a retaining ring 46. The end cap 16, on the other hand, defines a corresponding locking element 48 that resides within the retaining ring 46. When the end cap 16 is rotated, the locking element 48 rotates within the retaining ring 46. In this manner, the retaining ring and the locking element maintain the end cap 16 in alignment on the container 14 and prevent the end cap from being removed from the container.

In FIGS. 6 through 10, the container 14 defines recesses 44 and the retaining ring 46, while the end cap defines locking tabs 42 and locking elements 48. It should be understood, however, that these structures can be reversed. For instance, the recesses and the retaining ring can be located on the end cap, while the locking tabs and the locking element can be located on the container 14.

Referring to FIG. 6, the container 14 can also include an abutment 50. The abutment 50 can be designed to prevent the end cap 16 from rotating in a particular direction. For instance, the abutment 50 can be positioned to allow the end cap 15 to rotate in a direction so that the orifices 32, 34 and 36 become aligned with the aperture 26 and prevent the end cap 16 from rotating in an opposite direction.

Figure 11:
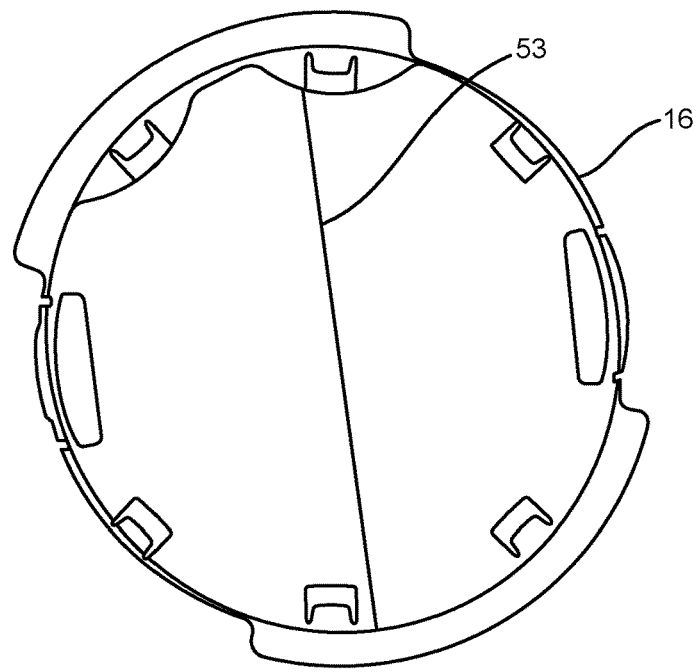
FIG. 11 illustrates a plan view of one embodiment of an end cap in accordance with the present disclosure.
Figure 12:
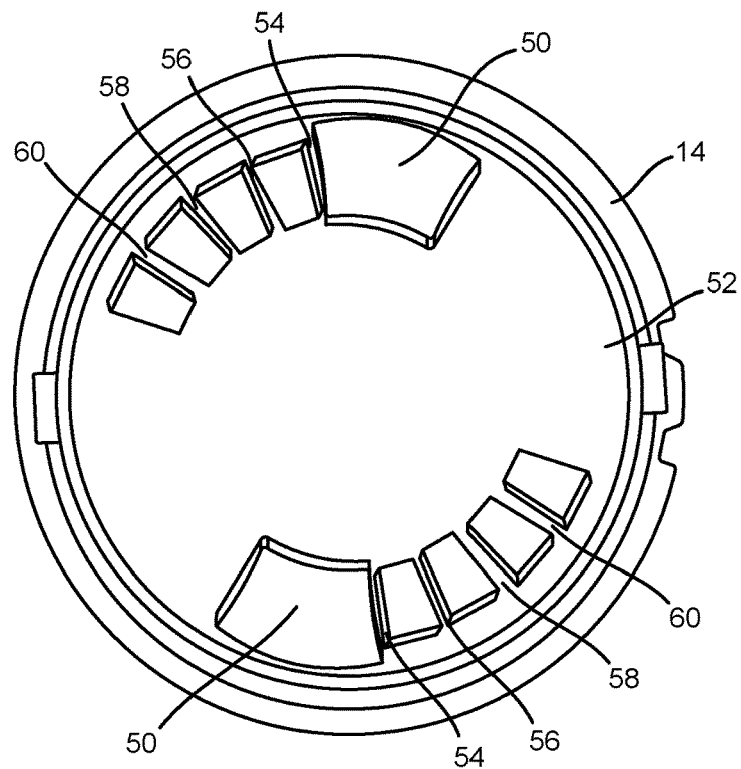
FIG. 12 illustrates a bottom view of a container made in accordance with the present disclosure that may be incorporated into a floating chemical dispenser.
Figure 13:
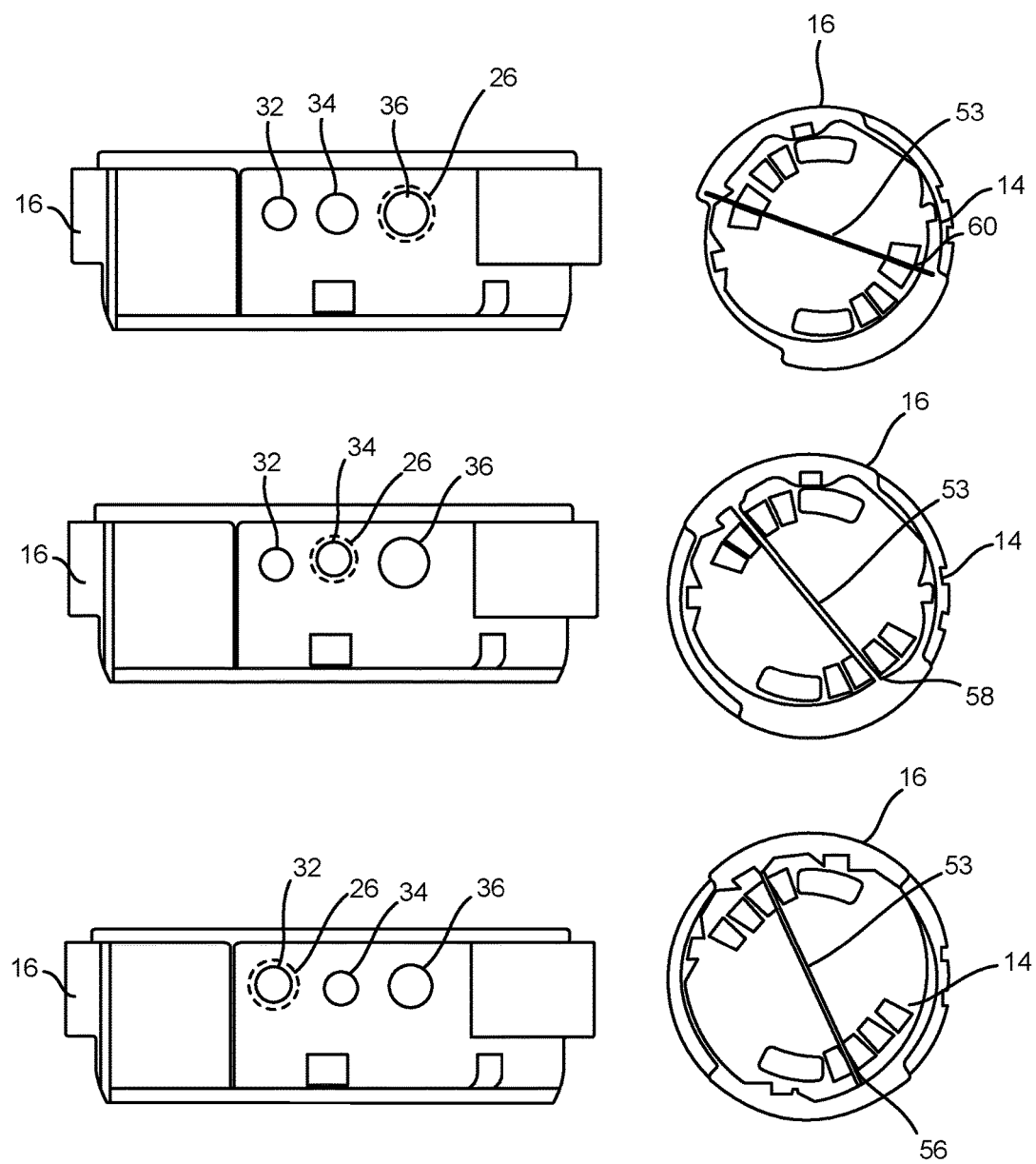
FIG. 13 illustrates one embodiment of an end cap engaged with a portion of a container that may be used to construct a floating chemical dispenser in accordance with the present disclosure.

In one embodiment, the floating chemical dispenser 10 can include a system that allows the user to know the closed position and the different chemical dispensing positions have been obtained when the end cap 16 is rotated. For instance, referring to FIGS. 11 through 13, the end cap 16 is shown in relation to a bottom surface 52 of the container 14. FIG. 11 illustrates the surface of the end cap 16 that resides adjacent to the bottom surface 52 as shown in FIG. 12. As shown in FIG. 11, the end cap 16 defines a rib member 53 that projects from the surface of the end cap 16. Referring to FIG. 12, the bottom surface 52 of the container 14, on the other hand, defines rib receiving channels 54, 56, 58 and 60. The rib receiving channels are located on a path of travel of the rib member when the end cap 16 is rotated. Each rib receiving channel 54, 56, 58 and 60 corresponds to a different position of the end cap 16 on the container 14. For instance, rib receiving channel 54 corresponds to the closed position of the floating chemical dispenser 10. Rib receiving channel 56 corresponds to a first chemical dispensing position, rib receiving channel 58 corresponds to a second chemical dispensing position, and rib receiving channel 60 corresponds to a third chemical dispensing position of the floating chemical dispenser. As shown in FIG. 13, for instance, when the end cap 16 is rotated such that the rib member 53 resides in the rib receiving channel 60, the large orifice 36 becomes aligned with the aperture 26 on the container 14. Similarly, when the end cap 16 is rotated such that the rib member 53 is contained within the rib receiving channel 58, the middle orifice 36 is aligned with the aperture 26. When the end cap 16 is rotated such that the rib member 53 resides in the rib receiving channel 56, on the other hand, the smallest orifice 32 is aligned with the aperture 26. When the end cap 16 is rotated as described above, a user will feel a sensation as the rib member 53 slides across the bottom surface 52 of the container 14 and enters and leaves each of the rib receiving channels 54, 56, 58 and 60. In this manner, a user can easily find each of the positions of the chemical dispenser as the end cap 16 is rotated.

As shown in FIGS. 12 and 13, the bottom surface 52 of the container 14 can also include abutments 60. The abutments 60 are designed to engage the rib member 53 and prevent the end cap 16 from rotating in a direction opposite to the rib receiving channels 54.

Figure 14:
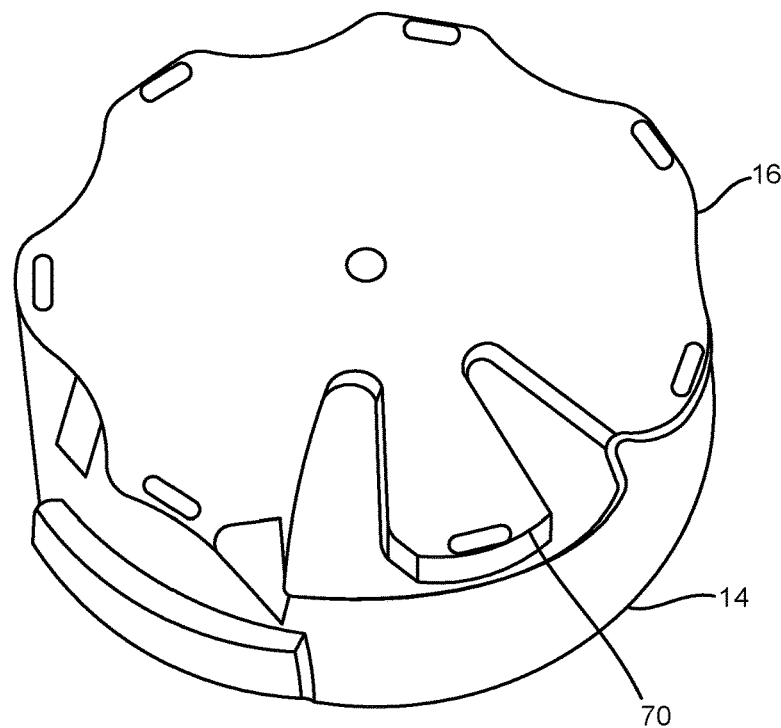
FIG. 14 illustrates another embodiment of a locking device that may be incorporated into an end cap in accordance with the present disclosure.

In the embodiment illustrated in FIGS. 4 through 10, one embodiment of a locking device is shown and illustrated. Referring now to FIGS. 14 through 17, other embodiments of locking devices that may be used in accordance with the present disclosure are shown. Like reference numerals have been used to indicate similar elements. Referring to FIG. 14, for instance the end cap 16 includes a single tab portion 70. The tab portion 70 includes a locking tab that engages the bottom of the container 14 and prevents the end cap 16 from rotating. For instance, the tab portion 70 can include a locking tab that resides in a recess within the container 14. In order to rotate the end cap 16, the tab portion 70 is raised. While the tab portion 70 is raised, the end cap 16 can be rotated to any desired position. In the embodiment illustrated in FIG. 14, the tab portion 70 engages the bottom of the container 14. In the embodiment illustrated in FIGS. 4 through 10, on the other hand, the locking tabs 42 engaged the side of the container 14.

Figure 15:
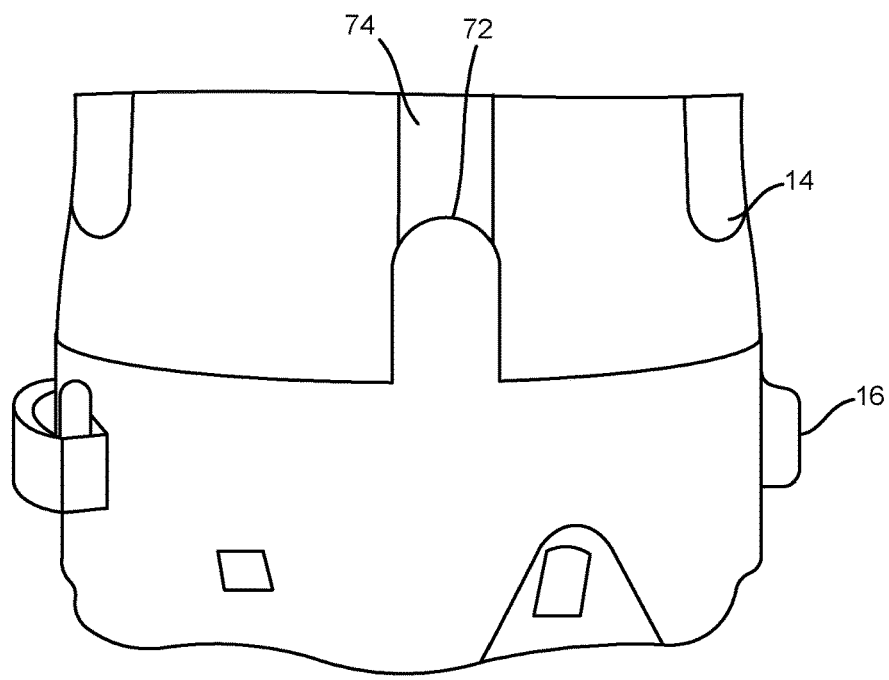
FIG. 15 illustrates another embodiment of a locking device that may be incorporated into an end cap in accordance with the present disclosure.

FIG. 15 illustrates another embodiment of a locking device in accordance with the present disclosure. In FIG. 15, the end cap 16 includes one or more removable locking tabs 72. As shown in FIG. 15, the locking tab 72 can reside within a channel or recess 74 defined by the container 14 which prevents the end cap 16 from rotating. In order to disable the locking device, the locking tab 72 is removable. For instance, the locking tab 72 can be torn away from the end cap 16 which allows the end cap 16 to rotate.

Figure 16:
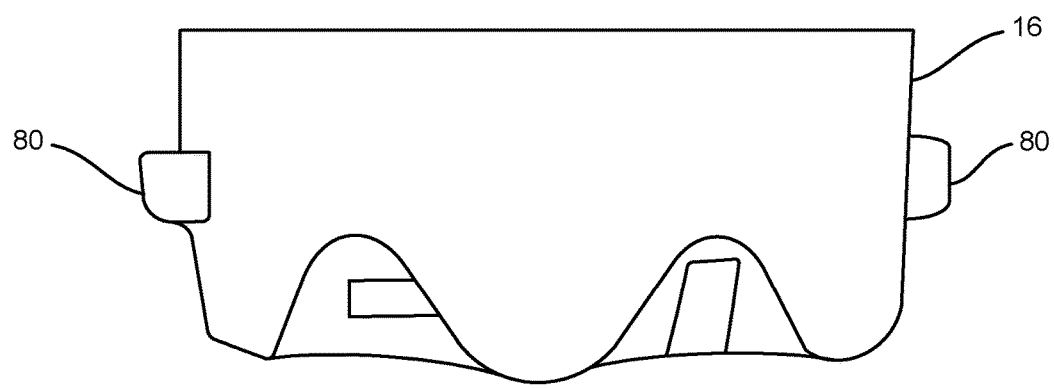
FIG. 16 illustrates another embodiment of a locking device that may be incorporated into an end cap in accordance with the present disclosure.

Still another embodiment of a locking device in accordance with the present disclosure is shown in FIG. 16. In FIG. 16, the end cap 16 includes one or more pull tabs 80. The pull tabs 80 include a locking tab that engages the container and prevents the end cap 16 from rotating. In order to disable the locking device, the pull tabs 80 are pulled away from the body of the container, which allows the end cap 16 to rotate.

Figure 17:
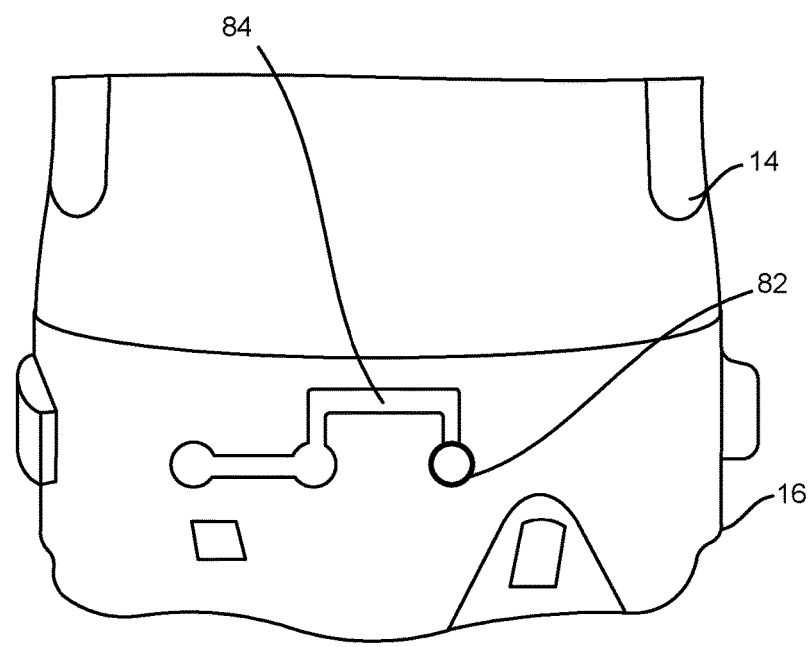
FIG. 17 illustrates another embodiment of a locking device that may be incorporated into an end cap in accordance with the present disclosure.

FIG. 17 illustrates yet another embodiment of a locking device in accordance with the present disclosure. In FIG. 17, the container 14 defines a pin 82 that resides within a slot 84 defined by the end cap 16. The slot 84 has a non-linear travel path. In the embodiment illustrated in FIG. 17, for instance, the slot includes a first vertical section followed by a first horizontal section followed by a second vertical section followed by a second horizontal section. In order to rotate the end cap 16, the end cap is twisted and manipulated so that the pin 82 follows the slot 84. Thus, in order to rotate the end cap 16 to the different chemical dispensing positions, the end cap is pulled downwardly and/or pushed upwardly while being rotated in order for the pin to follow the travel path of the slot 84. As shown in FIG. 17, the travel path of the slot 84 can include various stopping points where horizontal portions intersect with vertical portions. These stopping points can correspond to different positions on the floating chemical dispenser 10. Each stopping point, for instance, may define a closed position or a chemical dispensing position.

Figure 18:
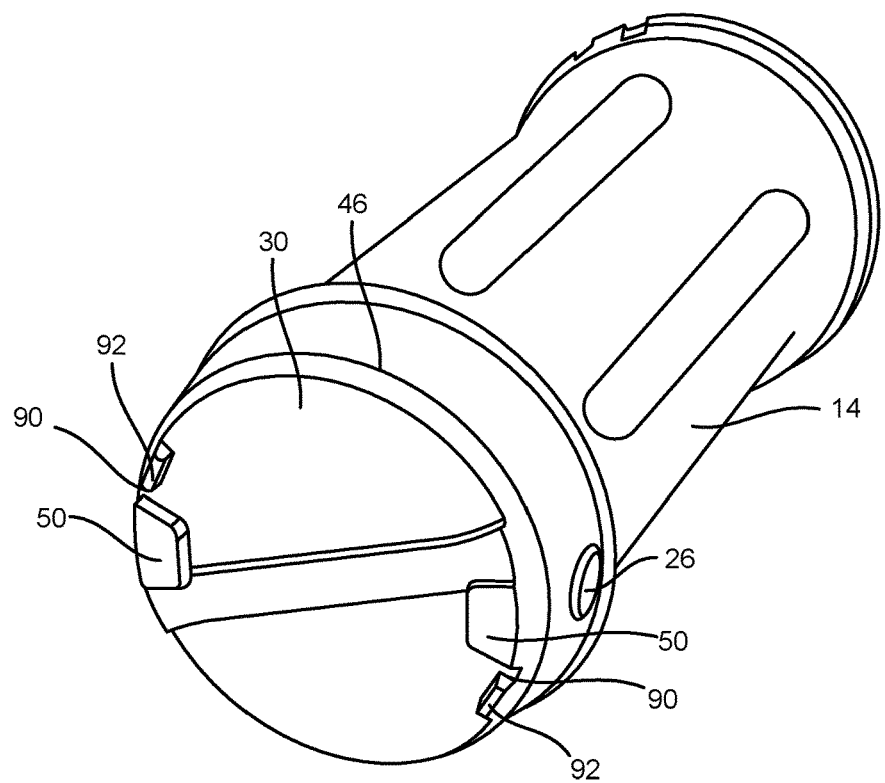
FIG. 18 illustrates yet another embodiment of a locking device that may be incorporated into the floating chemical dispenser illustrating the container portion of the locking device.
Figure 19:
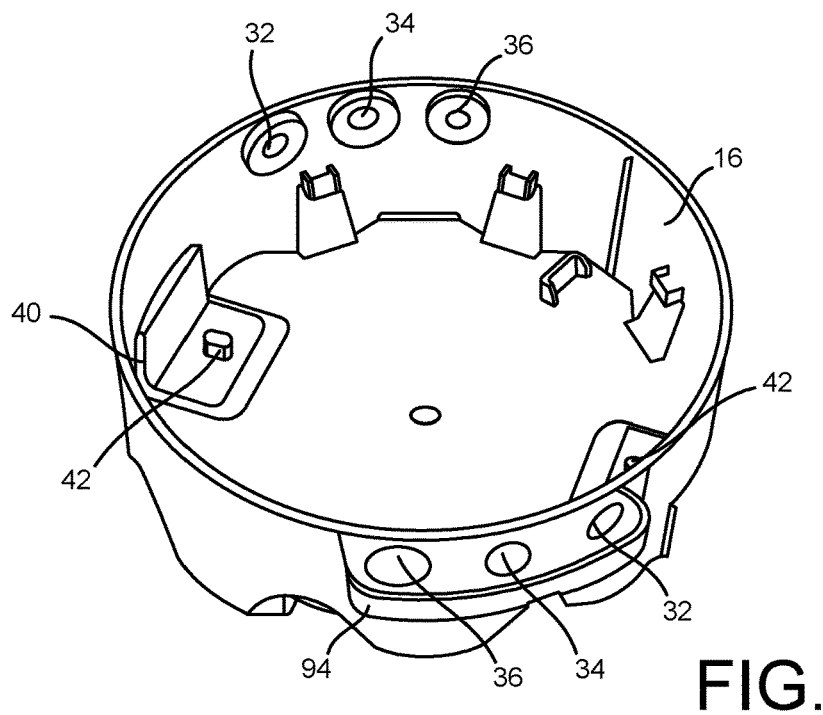
FIG. 19 illustrates an end cap that may be used in conjunction with the container illustrated in FIG. 18.

Referring to FIGS. 18 and 19, still another embodiment of a locking device in accordance with the present disclosure is shown. Like reference numerals have been used to indicate similar elements. In general, the locking device illustrated in FIGS. 18 and 19 is somewhat similar to the locking device illustrated in FIGS. 4 through 10. In the embodiment illustrated in FIGS. 18 and 19, however, the end cap 16 engages the bottom 30 of the container 14 instead of the side of the container.

Referring to FIG. 19, the end cap 16 includes opposing tab portions 40 similar to the embodiment illustrated in FIGS. 4 through 10. Located on each tab portion 40 is a locking tab 42. Locking tab 42 is located on the bottom surface of the end cap 16 facing the container 14.

Referring to FIG. 18, the container 14 includes a pair of opposing locking tab channels 90. The locking tab channels 90 are for receiving the corresponding pair of locking tabs 42 when the end cap 16 is in the locked position. The bottom 30 of the container 14 further defines a pair of opposing tab engaging members 92. The tab engaging members 92 prevent the locking tabs 42 from rotating when the end cap 16 is twisted. In order to disable the locking device, each of the tab portions 40 can be pressed inwardly simultaneously. When the tab portions 40 are pushed inwardly, the locking tabs 42 move radially within each locking tab channel 90 until locking tab 42 clears each corresponding tab engaging member 92. Consequently, pressing the tab portions 40 simultaneously allows the end cap 16 to rotate so that one of the orifices 32, 34, and 36 can align with the one or more apertures 26 on the container 14.

As shown in FIG. 18, the bottom 30 of the container 14 can further include two opposing abutments 60. The abutments 60 engage the locking tabs 42 and prevent the end cap 16 from rotating in one direction. In the embodiment illustrated in FIG. 18, for instance, the abutments 60 prevent the end cap from rotating counterclockwise. As shown, the abutments 60 have a greater length than the tab engaging members 92. In this manner, the end cap 16 is prevented from rotating in one direction even when the tab portions 40 are pressed inwardly.

As shown in FIG. 19, the end cap 16 includes two different sets of orifices. Likewise, the container 14 can include two different apertures 26 for engaging the orifices 32, 34 and 36. As also shown in FIG. 19, the end cap 16 can include a shield member 94 that protects the orifices 32, 34 and 36 from being contacted with a person's hand. The shield member 94, for instance, can prevent any lose chemical from contact with the user when the end cap 16 is rotated.

The locking device illustrated in FIGS. 18 and 19 may offer various advantages and benefits. For instance, by placing the locking tabs on the bottom surface of the end cap, the top of the end cap 16 can remain a solid structure for improved structural integrity.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A floating chemical dispenser for containing and dispensing chemicals to treat a body of water, the dispenser comprising;
    a float positioned at an upper end of the dispenser;
    a container having a top and a bottom, the top of the container being adjacent to the float, the container defining an interior compartment configured to hold a chemical, the container defining at least one aperture positioned to receive water from an outside environment for combining with a chemical and dispensing the chemical into a body of water;
    an end cap attached to the bottom of the container, the end cap being held on the container by a retaining device, the end cap defining at least one orifice and being rotatable in relation to the container, the end cap being rotatable between a closed position and a chemical dispensing position, wherein, when in the chemical dispensing position, the at least one orifice is aligned with the aperture on the container; and
    a locking device that prevents the end cap from rotating when enabled;

wherein the end cap includes two opposing tab portions and wherein pressing both tab portions simultaneously disables the locking device and allows the end cap to rotate.

2. A floating chemical dispenser as defined in claim 1, wherein the locking device comprises a locking tab located on the end cap and wherein pressing both of the tab portions simultaneously causes the locking tab to move from a locked position to an unlocked position so that the end cap can be rotated.

3. A floating chemical dispenser as defined in claim 2, wherein the locking tab resides in a recess located on the container which prevents the end cap from rotating and wherein pressing both tab portions simultaneously moves the locking tab out of the recess and disables the locking device.

4. A floating chemical dispenser as defined in claim 3, wherein the recess is located on a side wall of the container.

5. A floating chemical dispenser as defined in claim 2, wherein the locking device includes two locking tabs, each locking tab being located on one of the corresponding tab portions and wherein pressing both of the tab portions simultaneously causes the locking tabs to move from a locked position to an unlocked position so that the end cap can be rotated.

6. A floating chemical dispenser as defined in claim 5, wherein each locking tab is located on a bottom surface of the end cap facing the container, each locking tab being configured to engage a bottom surface of the container when the locking device is enabled to prevent the end cap from rotating.

7. A floating chemical dispenser as defined in claim 6, wherein the bottom surface of the container defines a pair of opposing tab engaging members that engage the corresponding locking tabs on the end cap and prevent the end cap from rotating and wherein pressing both tab portions simultaneously causes the locking tabs to move out of engagement with the tab engaging members.

8. A floating chemical dispenser for containing and dispensing chemicals to treat a body of water, the dispenser comprising;
   a float positioned at an upper end of the dispenser;
   a container having a top and a bottom, the top of the container being adjacent to the float, the container defining an interior compartment configured to hold a chemical, the container defining at least one aperture positioned to receive water from an outside environment for combining with a chemical and dispensing the chemical into a body of water;
   an end cap attached to the bottom of the container, the end cap being held on the container by a retaining device, the end cap defining at least one orifice and being rotatable in relation to the container, the end cap being rotatable between a closed position and a chemical dispensing position, wherein, when in the chemical dispensing position, the at least one orifice is aligned with the aperture on the container; and
   a locking device that prevents the end cap from rotating when enabled;
   wherein the locking device includes a tab portion that engages the container and prevents the end cap from rotating and, wherein lifting the tab portion causes the tab portion to disengage the container and disable the locking device.

9. A floating chemical dispenser for containing and dispensing chemicals to treat a body of water, the dispenser comprising;
   a float positioned at an upper end of the dispenser;
   a container having a top and a bottom, the top of the container being adjacent to the float, the container defining an interior compartment configured to hold a chemical, the container defining at least one aperture positioned to receive water from an outside environment for combining with a chemical and dispensing the chemical into a body of water;
   an end cap attached to the bottom of the container, the end cap being held on the container by a retaining device, the end cap defining at least one orifice and being rotatable in relation to the container, the end cap being rotatable between a closed position and a chemical dispensing position, wherein, when in the chemical dispensing position, the at least one orifice is aligned with the aperture on the container; and
   a locking device that prevents the end cap from rotating when enabled;
   wherein the locking device comprises a pull tab located on the end cap and wherein pulling the pull tab disables the locking device.

10. A floating chemical dispenser for containing and dispensing chemicals to treat a body of water, the dispenser comprising;
    a float positioned at an upper end of the dispenser;
    a container having a top and a bottom, the top of the container being adjacent to the float, the container defining an interior compartment configured to hold a chemical, the container defining at least one aperture positioned to receive water from an outside environment for combining with a chemical and dispensing the chemical into a body of water;
    an end cap attached to the bottom of the container, the end cap being held on the container by a retaining device, the end cap defining at least one orifice and being rotatable in relation to the container, the end cap being rotatable between a closed position and a chemical dispensing position, wherein, when in the chemical dispensing position, the at least one orifice is aligned with the aperture on the container; and
    a locking device that prevents the end cap from rotating when enabled;
    wherein the locking device comprises a pin on the container contained within a slot located on the end cap, the slot including a first vertical portion, a horizontal portion, and a second vertical portion, and wherein moving the end cap so that the pin travels over the slot causes the end cap to rotate and disables the locking device.

11. A floating chemical dispenser for containing and dispensing chemicals to treat a body of water, the dispenser comprising;
    a float positioned at an upper end of the dispenser;
    a container having a top and a bottom, the top of the container being adjacent to the float, the container defining an interior compartment configured to hold a chemical, the container defining at least one aperture positioned to receive water from an outside environment for combining with a chemical and dispensing the chemical into a body of water;
    an end cap attached to the bottom of the container, the end cap being held on the container by a retaining device, the end cap defining at least one orifice and being rotatable in relation to the container, the end cap being rotatable between a closed position and a chemical dispensing position, wherein, when in the chemical dispensing position, the at least one orifice is aligned with the aperture on the container; and a locking device that prevents the end cap from rotating when enabled;

wherein the end cap includes at least two orifices, the end cap including a first orifice that has a larger area than a second orifice and wherein the end cap rotates between a closed position, a first chemical dispensing position where the first orifice aligns with the aperture on the container and a second chemical dispensing position where the second orifice aligns with the aperture on the container.

12. A floating chemical dispenser as defined in claim 11, wherein the end cap includes a third orifice, the second orifice having a larger area than the third orifice and wherein the end cap is rotatable to a third chemical dispensing position wherein the third orifice aligns with the aperture on the container.

13. A floating chemical dispenser as defined in claim 11, wherein the end cap further includes a rib member and the container defines a plurality of rib receiving channels, the rib receiving channels being located along a path of travel of the rib member when the end cap is rotated, and wherein a first rib receiving channel is aligned with the first chemical dispensing position and a second rib receiving channel is aligned with the second chemical dispensing position.

14. A floating chemical dispenser for containing and dispensing chemicals to treat a body of water, the dispenser comprising;

a float positioned at an upper end of the dispenser;

a container having a top and a bottom, the top of the container being adjacent to the float, the container defining an interior compartment configured to hold a chemical, the container defining at least one aperture positioned to receive water from an outside environment for combining with a chemical and dispensing the chemical into a body of water;

an end cap attached to the bottom of the container, the end cap being held on the container by a retaining device, the end cap defining at least one orifice and being rotatable in relation to the container, the end cap being rotatable between a closed position and a chemical dispensing position, wherein, when in the chemical dispensing position, the at least one orifice is aligned with the aperture on the container; and a locking device that prevents the end cap from rotating when enabled;

wherein the end cap includes a rib member and wherein the container defines a plurality of rib receiving channels, the rib receiving channels being located along a path of travel of the rib member when the end cap is rotated, and wherein a rib receiving channel aligns with the rib member at the closed position of the end cap and wherein another rib receiving channel aligns with the rib member when the end cap is rotated to the chemical dispensing position.

15. A floating chemical dispenser as defined in claim 14, wherein the container further defines an abutment that prevents the rib member from rotating in a direction opposite the chemical dispensing position.

16. A floating chemical dispenser as defined in claim 14, wherein the container includes an open top end and a closed bottom end.

* * * * *